(12) United States Patent
Parnas et al.

(10) Patent No.: US 8,597,518 B2
(45) Date of Patent: Dec. 3, 2013

(54) PERVAPORATION COMPOSITE MEMBRANE FOR AQUEOUS SOLUTION SEPARATION AND METHODS FOR USING THE SAME

(75) Inventors: Richard S. Parnas, Ashford, CT (US); Si-Yu Li, Willimantic, CT (US)

(73) Assignee: The University of Connecticut, Farmington, CT (US)

( * ) Notice: Subject to any disclaimer, the term of this patent is extended or adjusted under 35 U.S.C. 154(b) by 439 days.

(21) Appl. No.: 12/859,364

(22) Filed: Aug. 19, 2010

(65) Prior Publication Data

US 2011/0042315 A1   Feb. 24, 2011

Related U.S. Application Data

(60) Provisional application No. 61/235,099, filed on Aug. 19, 2009.

(51) Int. Cl.
| | | |
|---|---|---|
| *B01D 15/00* | (2006.01) | |
| *B01D 29/00* | (2006.01) | |
| *B01D 39/00* | (2006.01) | |
| *B01D 71/06* | (2006.01) | |
| *C02F 1/44* | (2006.01) | |

(52) U.S. Cl.
USPC . 210/640; 210/490; 210/500.27; 210/500.36; 210/502.1

(58) Field of Classification Search
USPC ............ 210/640, 490, 500.27, 500.36, 502.1; 95/45–52
See application file for complete search history.

(56) References Cited

U.S. PATENT DOCUMENTS

| | | | | |
|---|---|---|---|---|
| 4,230,463 A | * | 10/1980 | Henis et al. | ........................ 95/47 |
| 4,618,534 A | | 10/1986 | Iwama et al. | |
| 4,664,669 A | * | 5/1987 | Ohyabu et al. | ............. 428/304.4 |
| 4,919,857 A | * | 4/1990 | Hojyo | ............................ 264/496 |
| 4,925,562 A | * | 5/1990 | te Hennepe et al. | ...... 210/500.25 |
| 4,963,165 A | | 10/1990 | Blume et al. | |
| 5,049,167 A | | 9/1991 | Castro et al. | |
| 5,167,825 A | | 12/1992 | Lipski et al. | |
| 5,169,533 A | * | 12/1992 | Baker et al. | .................... 210/640 |
| 5,195,133 A | * | 3/1993 | Kapp et al. | ....................... 705/75 |
| 5,254,251 A | | 10/1993 | Bengtson et al. | |
| 5,265,734 A | * | 11/1993 | Linder et al. | ................... 210/654 |
| 5,266,206 A | * | 11/1993 | Baker et al. | .................... 210/640 |
| 5,334,314 A | | 8/1994 | Neel et al. | |

(Continued)

OTHER PUBLICATIONS

Huang et al.; "BioSep: A New Ethanol Recovery Technology for Small Scale Rural Production of Ethanol from Biomass"; AICHE; San Francisco, California; Nov. 2006; 19 Pages.

(Continued)

*Primary Examiner* — Ana Fortuna
(74) *Attorney, Agent, or Firm* — Cantor Colburn LLP

(57) ABSTRACT

In one embodiment, a membrane comprises: a nonporous, hydrophobic selective layer configured to be on a feed solution side of the membrane and polyethylene layer configured to be on a permeate side of the membrane, wherein the membrane is configured to selectively separate an organic component from an aqueous solution. In some embodiments, the method for separating an organic component from an aqueous stream can comprise: contacting a nonporous, hydrophobic selective layer of a membrane with the aqueous stream comprising the organic component, creating a vacuum on the side of the membrane comprising the support layer, permeating the organic component through the membrane into an exit chamber, and removing the organic component permeate from the exit chamber.

19 Claims, 4 Drawing Sheets

(56) References Cited

U.S. PATENT DOCUMENTS

| | | | |
|---|---|---|---|
| 5,382,364 A | 1/1995 | Bowser et al. | |
| 5,428,123 A * | 6/1995 | Ward et al. | 528/28 |
| 5,601,767 A * | 2/1997 | Firgo et al. | 264/101 |
| 5,681,473 A * | 10/1997 | Miller et al. | 210/651 |
| 5,755,967 A * | 5/1998 | Meagher et al. | 210/640 |
| 5,993,515 A | 11/1999 | Sirkar | |
| 6,117,328 A * | 9/2000 | Sikdar et al. | 210/640 |
| 6,440,309 B1 | 8/2002 | Cohen | |
| 6,478,852 B1 * | 11/2002 | Callaghan et al. | 95/54 |
| 6,755,975 B2 | 6/2004 | Vane et al. | |
| 6,899,743 B2 | 5/2005 | Wijmans et al. | |
| 7,045,062 B1 * | 5/2006 | Aminabhavi et al. | 210/500.43 |
| 2009/0188863 A1 | 7/2009 | Knapp et al. | |

OTHER PUBLICATIONS

Butamax Advanced Biofuels LLC Fact Sheet; 2008; 2 Pages.

Muller et al.; "Coupling of Gas Membrane Smooth Pervaporation and Alcoholic Fermentation"; J. Chem. Tech. Biotechnol., vol. 52 (1991); pp. 343-358.

Vane, Leland M., PhD; "Separation Technologies for the Recovery and Dehydration of Alcohols from Fermentation Broths"; Biofpr, Biofuels Bioproducts & Biorefining; Published Oct. 21, 2008; pp. 553-588.

* cited by examiner

PERVAPORATION COMPOSITE MEMBRANE FOR AQUEOUS SOLUTION SEPARATION AND METHODS FOR USING THE SAME

CROSS REFERENCE TO RELATED APPLICATION

This application claims the benefit of U.S. Provisional Application 61/235,099 filed Aug. 19, 2009, which is incorporated herein by reference in its entirety.

GOVERNMENT CONTRACT

This invention was made with government support pursuant to Government Contract No: 2008-34603-19452 awarded by USDA/CSREES. The Government has certain rights in this invention.

BACKGROUND

Conventional transportation fuels and many fine chemicals (e.g. monomers, polymers, plasticizers, adhesives, thickeners, aromatic and aliphatic solvents, etc.) are typically derived from non-renewable raw materials such as petroleum. However, there is increasing concern that the use of petroleum as a basic raw material contributes to environmental degradation (e.g., global warming, air and water pollution, etc.) and fosters overdependence on unreliable petroleum supplies from politically unstable parts of the world.

Thus, biofuels and biomass-derived organic chemical materials provide significant environmental benefits. At present, biofuels tend to be produced using local agricultural resources in many relatively small facilities, and are viewed as providing a stable and secure supply of fuels independent of the geopolitical problems associated with petroleum. At the same time, biofuels can enhance the agricultural sector of national economies. In addition, environmental concerns relating to the possibility of carbon dioxide related climate change is an important social and ethical driving force which is triggering new government regulations and policies such as caps on carbon dioxide emissions from automobiles, taxes on carbon dioxide emissions, and tax incentives for the use of biofuels.

N-butanol is a promising biofuel alternative to gasoline. Several microorganisms produce n-butanol by fermentation. Fermentation is currently used to make acetone, ethanol, isopropanol, n-propanol, n-butanol (also known as "biobutanol"), amyl alcohol, acetic acid, and other organic acids and flavor compounds, for example. While it is well known to use processes such as distillation and gas stripping to effect such separation of the biofuel from the fermentation broth, these conventional processes, particularly distillation, are generally characterized by high capital and energy costs thus often making such conventional processes problematic, for example, it has been noted that in excess of 60% of the heating value of a biofuel, such as butanol, can be "wasted" if conventional separation processes are employed. Additionally, since biobutanol has a higher normal boiling point than water, conventional distillation is not a suitable option for the recovery of the biobutanol.

Therefore, an alternate process for effecting such separations known as pervaporation has received considerable attention as a solution to the aforementioned "waste". In a pervaporation process, a charge liquid, often a fermentation broth, is brought into contact with a membrane having the property to allow a component of the charge liquid (solution) to preferentially permeate the membrane. This permeate is then removed as a vapor from the downstream side of the membrane film. Transport through the membrane is achieved by the difference in partial pressure between the liquid feed solution and permeate vapor. Solvent/solute separation is achieved due to the difference in relative volatilities and membrane permeabilities of the feed solution compounds. The efficiency of a membrane pervaporation process is measured by its Flux and Separation Factor. Flux is a measure of the weight of solute which passes through the membrane per the membrane area per a unit of time. Separation Factor is the concentration ratio of solute to solvent in the permeate divided by the concentration ratio of solute to solvent in the feed solution.

While polymers such as polyimides, polydimethylsiloxanes and the like have been used to form pervaporation membranes with some successes, to date, none have demonstrated the necessary characteristics to become a commercial success. Hence, there is a continual need for membranes with improved flux and/or separation factors and/or reduced cost in the separation of biofuel.

BRIEF DESCRIPTION

This disclosure is directed to membranes, methods for making and using the membranes and systems for separating organic component from an aqueous solution.

In one embodiment, a membrane comprises: a nonporous, hydrophobic selective layer configured to be on a feed solution side of the membrane and polyethylene layer configured to be on a permeate side of the membrane, wherein the membrane is configured to selectively separate an organic component from an aqueous solution.

In another embodiment, a membrane comprises: a nonporous selective layer comprising polydimethylsiloxane, a porous support layer, and a polyethylene layer disposed between the support layer and the selective layer, wherein the membrane is configured to selectively separate an organic component from an aqueous solution.

In some embodiments, the method for separating an organic component from an aqueous stream can comprise: contacting a nonporous, hydrophobic selective layer of a membrane with the aqueous stream comprising the organic component, creating a vacuum on the side of the membrane comprising the support layer, permeating the organic component through the membrane into an exit chamber, and removing the organic component permeate from the exit chamber.

The above described and other features are exemplified by the following figures and detailed description.

BRIEF DESCRIPTION OF THE DRAWING

Refer now to the figures, which are merely exemplary, not limiting, and wherein like numbers are numbered alike.

DETAILED DESCRIPTION

It has unexpectedly been discovered that employing a porous polyethylene (PE) layer(s), enhanced the n-butanol flux from 33% to 293%, and similarly increase the separation factor (depending on temperature). Hence, disclosed herein is a membrane for separation of organic components from an aqueous solution, e.g., the separation of butanol (e.g., n-butanol, also known as "biobutanol") from a fermentation broth. Although the following description discusses butanol for convenience and clarity, it is understood that separation of various organic component(s) from an aqueous streams are contemplated and covered herein. For example, membranes of the type disclosed herein may be used in the separation of an alcohol (e.g., ethanol, butanol, propanol, and/or the like), from various aqueous streams (e.g., fermentation mixture/broth, ground water, recycle stream(s) for various processes, and so forth).

Figure 1:
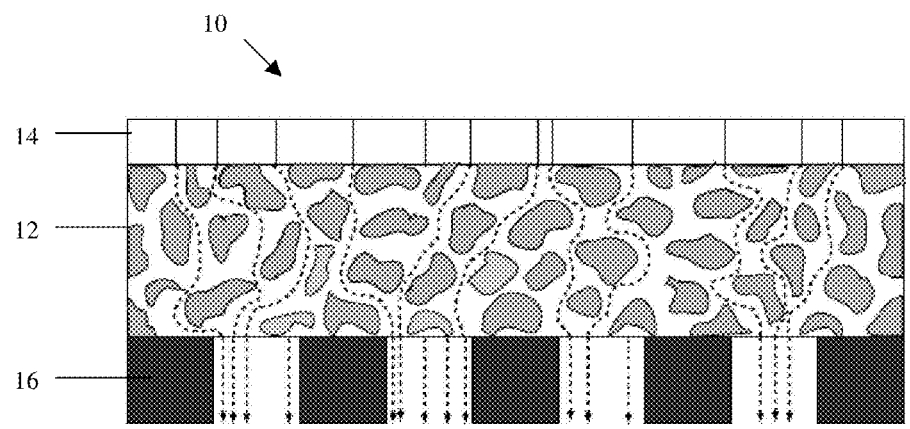
FIG. 1 is a cross-sectional side view of the PDMS-PE composite membrane.
Figure 7:
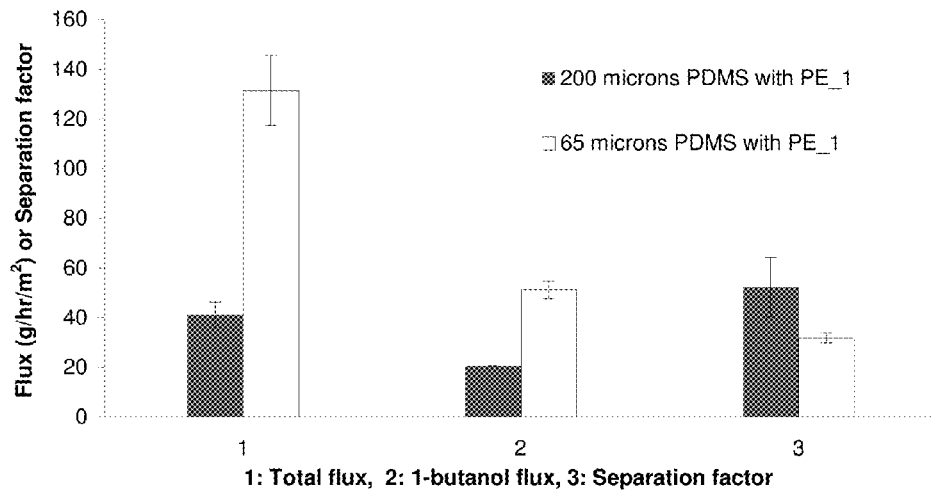
FIG. 7 is a bar graph of total flux, butanol flux, and separation factor for composite membranes having PDMS layer thicknesses of 200 micrometers and 65 micrometers, respectively.
Figure 8:
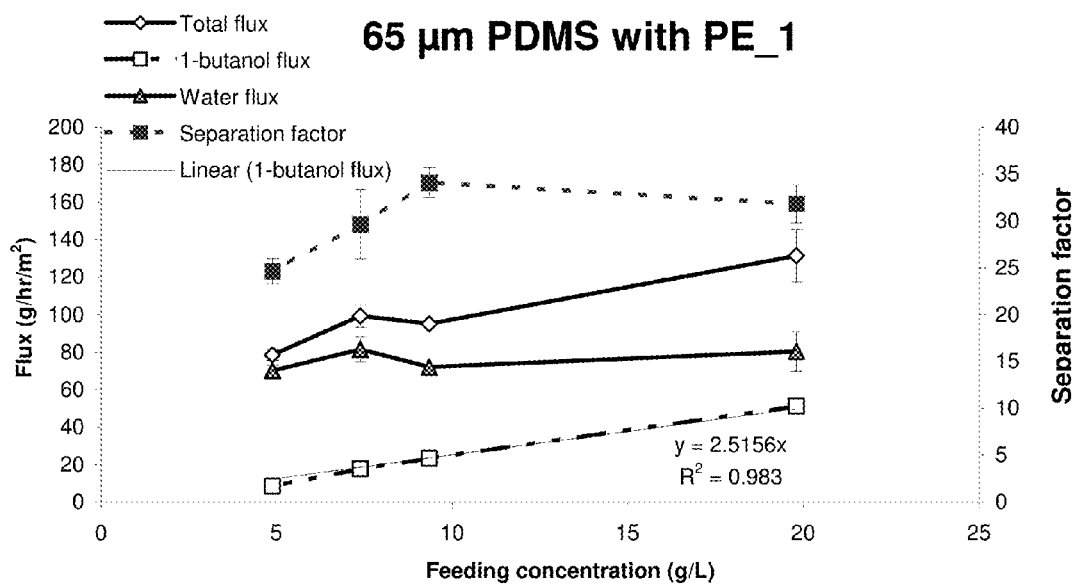
FIG. 8 is a graphical representation of feeding concentration versus flux for a composite membrane having a PDMS layer with a thickness of 65 micrometers.

The membrane comprises a porous polyethylene layer and nonporous hydrophobic layer. For example, referring to FIG. 1, the membrane (10) comprises a polyethylene layer (12) disposed between a selective layer (14) comprising polydimethylsiloxane, and a support layer (16). The selective layer (14) forms the feed solution side of the membrane, while the support layer (16) forms the permeate side of the membrane. The membrane can have various shapes (e.g., flat, tubular, etc.), and various thicknesses, e.g., up to and exceeding 4,000 micrometers. Typically, thinner membranes lead to higher fluxes and lower separation factors, as indicated in FIG. 7.

The membrane can be contacted with the aqueous solution such that the organic component(s) pass through the membrane to form a permeate vapor on the opposite side of the membrane. The process can be affected using a delta pressure across the membrane, and optionally by controlling the temperature of the aqueous solution within a desired range.

The selective layer is a nonporous layer that has a selectivity for the organic component(s) to be separated from the solution, e.g., a hydrophobic layer. For example, the selective layer can comprise polydimethylsiloxane ("PDMS", also known as silicone rubber), nitrile rubber, neoprene rubber, silicone-polycarbonate copolymers, fluoroelastomers, polyurethane, polyvinyl chloride, polybutadiene, polyolefin elastomers, polyesters, polyethers, as well as combinations comprising at least one of the foregoing.

The thickness of this layer is sufficient to attain a balance between the flux and the selectivity (as the selectivity increases the flux decreases). In some embodiments, the selective layer (e.g., the PDMS layer) has a thickness of up to 1,000 micrometers, specifically 1 micrometer to 1,000 micrometers, more specifically, 3 micrometers to 500 micrometers, yet more specifically, 10 micrometers to 300 micrometers, and even 50 micrometers to 250 micrometers. The selective layer is designed to be in contact with the aqueous solution, while the polyethylene layer is designed to be on the permeate side of the selective layer.

The selective layer can optionally comprise hydrophobic filler(s), e.g., absorbents capable of absorbing volatile organic compounds intended to be separated from the solution. The hydrophobic filler(s) can be present in the selective layer in an amount of 1 wt % to 25 wt %, based upon a total weight of the selective layer. Alternatively or in addition to activated carbon and/or silicalite, hydrophobic adsorbents that can be used include hydrophobic adsorbents with a very large surface area (e.g., greater than 400 square meters per gram ($m^2/g$)), such as carbonaceous adsorbents made by polymer pyrolysis, and/or hydrophobic inorganic adsorbents having a very high surface area, such as hydrophobic zeolite-based adsorbents, hydrophobic molecular sieves, hydrophobic polymer resin adsorbents, and the like, as well as combinations comprising at least one of the foregoing. Some exemplary hydrophobic absorbents are disclosed in U.S. Pat. No. 6,117,328 to Sikdar et al., and U.S. Pat. No. 5,755,967 to Meagher et al.

The polyethylene (PE) layer can have microscale pores. For example, the PE layer can have a pore size of greater than 1 micrometers, specifically 1 micrometers to 200 micrometers, more specifically, 20 micrometers to 125 micrometers; e.g., the pore sizes can be clustered at 30 micrometers to 40 micrometers. As used herein, unless specified otherwise, the pore size is measured along a major axis. The thickness of the polyethylene layer can be up to 2,000 micrometers, specifically, 200 micrometers to 2,000 micrometers, more specifically, 500 micrometers to 1,000 micrometers.

The support layer should have a flow resistance that is very small compared to the selective layer. For example, the support layer can comprise a relatively open, porous substrate. The support layer can be an inert material (i.e., non-chemically reactive in the environment in which it is to be employed), that has sufficient structural integrity to support the other layers of the membrane under the stress of the pressure gradient imposed by the pervaporation system. Possible materials for the support layer include metals, glass, graphite, polymeric materials, ceramic materials, as well as combinations comprising at least one of the foregoing materials. Exemplary polymeric materials include polysulfone, polyimide, polyvinylidene fluoride, polyamide, polyolefin(s) (e.g., polyethylene (such as polytetrafluoroethylene), polyphenylene (such as polyphenylene sulfide), polypropylene, fluorinated polyolefin(s), polytrimethylpentene), polyvinylidene difluoride, and combinations comprising at least one of the foregoing polymeric materials. Exemplary ceramic materials include silica, zirconia, alumina, other inorganic oxide support whose surface possesses surface hydroxyls or a surface that can be hydrolyzed to create surface hydroxyls, as well as combinations comprising at least one of the foregoing ceramics. Exemplary metals include zinc, titanium, as well as combinations comprising at least one of the foregoing metals. Some exemplary metal alloys include brass, stainless steel, and so forth. Some exemplary support materials are disclosed in U.S. Pat. No. 6,440,309 to Cohen, and U.S. Pat. No. 5,334,314 to Neel et al.

The support layer can be homogenous (i.e., the entire support is made of the same material and of the same pore size) or asymmetric. An asymmetric porous support layer can comprise a thin or thick layer (as compared to each other) with small pores on top of an underlying ceramic support with larger pores. The thinner support layer can exist on either side or both sides of the larger pore support layer. In all cases, the flow resistance through the support layer should be much lower than the resistance through the polyethylene layer. In some embodiments, the average pore size can be greater than or equal to 100 micrometers greater than the pore size of the polyethylene layer, specifically, greater than or equal to 150 micrometers greater than the pore size of the polyethylene layer, and yet more specifically, greater than or equal to 200 micrometers greater than the pore size of the polyethylene layer; e.g., the support layer can have a pore size of greater than or equal to 200 micrometers.

The geometry of the support layer can be a circular disk form, rectangular, tubular (e.g., hollow fiber), multi-channel array, as well as combinations comprising at least one of the foregoing. At present, commercially available ceramic support membranes have porosities (i.e., pore volume fraction) that are about 30% or higher. In general, it is preferred to utilize ceramic membrane support with a porosity (i.e., void fraction) equivalent to 30% or higher.

The membrane can be formed by various techniques. In one embodiment, e.g., for simplicity and reduced expense, the layers can be formed separately, stacked together, and held together, e.g., in a frame. The membranes can be formed as flat sheets, hollow fibers, tubular membranes or any other convenient form, and housed in any appropriate cartridge or module configuration, such as a spiral-wound module, a plate-and-frame module or a potted hollow-fiber cartridge. For example, the layers can be cast as flat sheets, and then rolled into spiral-wound modules.

The process for selectively removing component(s) from an aqueous solution can use a separation assembly comprising a feed chamber (e.g., for holding and introducing the aqueous solution to be treated therein), an exit chamber located adjacent to and downstream of the feed chamber, and a membrane(s) located therebetween and adapted for fluid registry therewith. For example, if the membrane is tubular, the bore (the inner area), can be the feed chamber, while the exit chamber can surround the tubular membrane (e.g., hollow fiber) and can be defined by a shell and the outside surface of the membrane. If the membrane is planar (e.g., a flat, polygonal and/or rounded membrane), the feed chamber can be on one side of the membrane (the side with the selective layer), and the exit chamber can be on the opposite side of the membrane (the side with the support layer).

To facilitate the separation, a vacuum is generally created across the membrane. For example a vacuum pump (e.g., an oil-less vacuum pump) can be employed for evacuating the component selectively removed from the aqueous solution that permeates into the exit chamber. The pressure in the exit chamber can be lower than the pressure in the feed chamber, e.g., a pressure of −13 pounds per square inch (psi) to −14.7 psi, with the pressure in the feed chamber being 0 psi to 30 psi. The change in pressure (ΔP) across the membrane can be 5 psi to 100 psi, is typically, 10 psi to 40 psi, and more specifically, 12 psi to 30 psi.

The solution can be introduced to the feed chamber so as to contact the selective layer of the membrane. Optionally, the temperature of the solution can be maintained at 15° C. to 60° C., specifically, 25° C. to 50° C., and more specifically, 25° C. to 40° C., and yet more specifically, 35° C. to 40° C., e.g., for separating butane from a stream. For example, the temperature of the aqueous solution can be maintained above room temperature, e.g., at 27° C. to 50° C. The exit chamber can be evacuated to create the desired delta pressure across the membrane. The component, e.g., n-butanol, is selectively separated from the aqueous solution, by passing through the membrane to the exit chamber, thereby forming the permeate.

Figure 2:
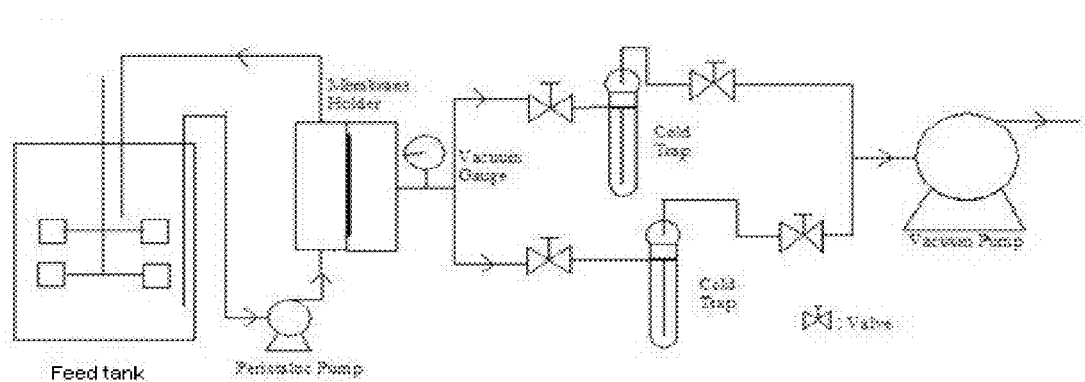
FIG. 2 is a schematic illustration of the apparatus used in the pervaporation experiments.

Optionally, a sweep gas or vapor can be used on the permeate side to remove the permeating vapor, e.g., continuously remove the permeate. Also optional is a condenser that can be located in fluid communication with the exit chamber so that the permeate can be received from the exit chamber and condensed. An exemplary arrangement is illustrated in FIG. 2 wherein a feed stream moves from a feed tank past the feed solution side of the membrane so as to contact the selective layer. The component then passes through the membrane, past the support layer and into the exit chamber. The component can then be removed from the exit chamber and condensed, stored, and/or otherwise processed.

Exemplary pervaporation processes wherein the membrane can be used are disclosed in U.S. Pat. No. 6,755,975 to Vane et al., and U.S. Pat. No. 6,899,743 to Wijmans et al.

The following examples are merely exemplary and are intended to further explain and not to limit the process and system disclosed herein.

EXAMPLES

Example 1

The effects of using the polyethylene layer in combination with the PDMS were determined. Several arrangements were tested. In all of the arrangements, the support layer was a brass layer having a pore size of 508 micrometers and a thickness of 406 micrometers. The PDMS layer (Sylgard® 184 commercially available from Dow Corning) had a thickness of 200 micrometers (the PDMS layer is non porous). The PE layer was either a hydrophilic polyethylene sheet with a pore size of 75 to 110 micrometers and a thickness of 610 micrometers (PE__1; hydrophilic polyethylene commercially available as POR-41210 from Porex Corporation, Fairburn, Ga.) or a hydrophobic polyethylene sheet (that is, absent fillers that render the polyethylene hydrophilic) with a pore size of 35 micrometers and a thickness of 888 micrometers (PE__2; commercially available as POR-4896 from Porex Corporation, Fairburn, Ga.). The arrangements tested, starting from the solution (e.g., feed solution) side to the permeate side: Sample 1 was PDMS/support layer (no PE layer); Sample 2 was PE__1/PDMS/support layer; Sample 3 was PDMS/PE__1/support layer; and Sample 4 was PDMS/PE__2/support layer.

The arrangements were formed by physically placing the respective layers adjacent one another in a composite membrane holder (e.g., a frame that merely held the layers in place). The tests were performed using the apparatus illustrated in FIG. 2. The tests were performed at 37° C., 750 mmHg to 770 mmHg at the feed solution side, and less than 1 mmHg at vapor side (permeate side). The concentration of 1-butanol in the feed solution (the aqueous solution) was 2% (20 g/L).

Figure 3:
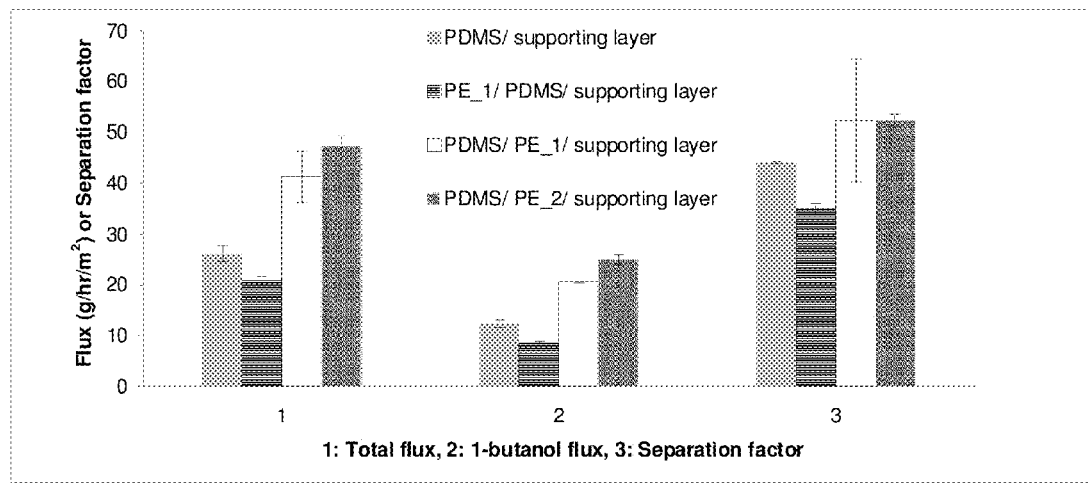
FIG. 3 is a graphical representation of the performances of PDMS and PDMS-PE composite membrane for the separation of n-butanol.

The results are illustrated in FIG. 3. As can be seen from the graph, it was not obvious that the use of a PE layer would enhance the separation, especially when considering that Sample 2 actually decreased the total flux (bars 1), n-butanol flux (bars 2), and the separation factor (bars 3). Merely using a PE layer in combination with the PDMS is not necessarily beneficial. However, when the PE layer was used between the PDMS layer and the support layer, the total flux, n-butanol flux, and separation factor were all improved. For example the total flux improved from about 27 grams per hour per square meter (g/hr/m$^2$) to about 41 g/hr/m$^2$; approximately 50% improvement from no PE layer to having the PE layer between the PDMS and the support layer, and an approximately 75% improvement when the PE layer had smaller pores (e.g., 35 micrometers instead of 75 to 100 micrometers). At least considering the decrease in flux when the PDMS layer was between the PE layer and the support layer, the fact that the PE layer between the PDMS layer and the support layer would enhance flux was unexpected. It was further unexpected that decreasing the pore size and changing the chemical formulation of the PE layer would further enhance the flux (e.g., an about 20% further improvement) when the PE layer was changed from PE__1 to PE__2.

Example 2

Figure 4:
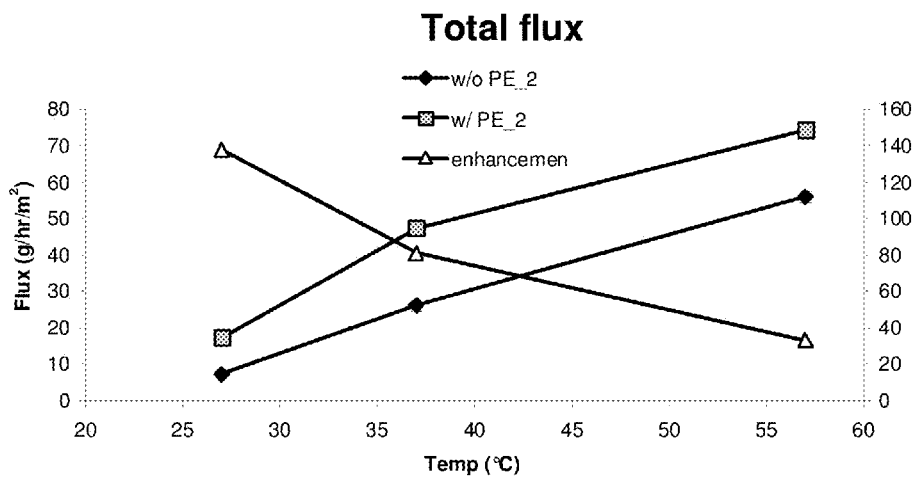
FIGS. 4-6 are graphical representations of the effects of temperature on the enhancement provided by the PE enhancement layer; illustrating total flux, n-butanol flux, and separation factor, respectively.
Figure 5:
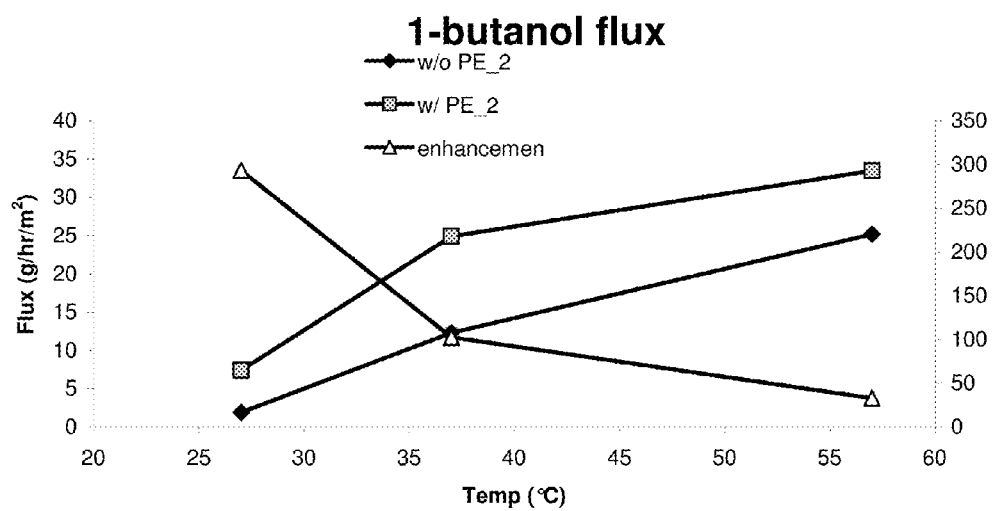
Figure 6:
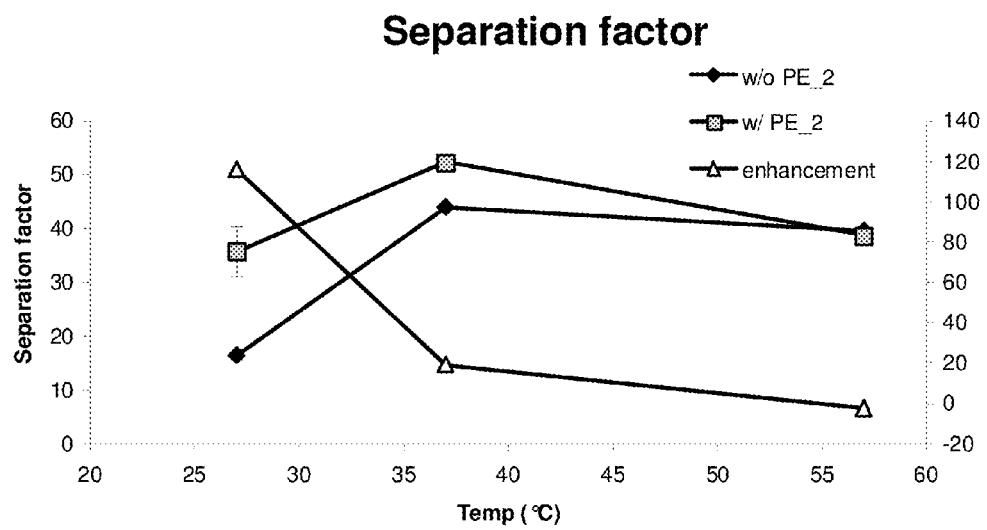

FIGS. 4-6 compare Sample 1 to Sample 4, (wherein "w/" means with and "w/o" means without). In other words, a membrane with the PE between the PDMS and the support, versus a membrane without the PE between the PDMS and the support. These figures illustrate the unexpected, large, enhancement (e.g., in FIG. 4, enhancement is total flux w PE_2 divided by the total flux w/o PE_2) attained by using the polyethylene layer between the PDMS layer and the support.

In Table 1, the enhancement percent was determined at different temperatures. The enhancement percent was based upon the results obtained for a membrane with the PE_2 between the PDMS and the support as compared to a membrane without the PE_2 between the PDMS and the support.

TABLE 1

| Enhancement (%) | | | |
| --- | --- | --- | --- |
| Temperature (° C.) | total flux | butanol flux | separation factor |
| 27 | 137.71 | 293.35 | 116.00 |
| 37 | 81.04 | 102.60 | 18.96 |
| 57 | 32.97 | 33.00 | −2.40 |

As is clear from Table 1, at about 35° C.-40° C., greater than 100% enhancement in butanol flux and nearly 19% enhancement in separation factor are attained. At 25° C.-30° C., greater than 290% enhancement in butanol flux and greater than 115% enhancement in separation factor are attained.

The present membrane-based methods for biobutanol removal are important because they can be easily integrated into the fermentation process, and the removal of butanol during fermentation is critical due to the high toxicity of butanol to the microorganisms producing the butanol.

Membranes of the type disclosed herein can also be useful in other aqueous separation processes. Some other possible applications include the treatment of contaminated ground water, treatment of chemical processing stream(s), and so forth. Some other possible components that can be separated include other organic components such as other alcohols (e.g., ethanol, propanol, and so forth).

Conventional wisdom for membrane separation processes has been the use of a single layer membrane having nanoscale pores, essentially teaching away from the present membrane.

As is illustrated above, it has been unexpectedly discovered that enhanced performance can be attained via the addition of another layer between the selective layer and a support, namely the polyethylene layer having microscale pores. The selective membrane is a nonporous, hydrophobic membrane, while the polyethylene membrane is a microporous membrane located on the permeate side of the nonporous membrane. As is shown in the examples, even with mere physical contact between these membranes (e.g., even without chemical interaction between the layers such as that which would result from combining the materials (e.g., PDMS and PE) into a single membrane), substantial enhancement is attained.

The present selective membrane renders the in situ pervaporation process feasible. Pervaporation not only has great potential to be incorporated into the fermentation process, it also has several advantages over other In situ product recovery (ISPR) techniques, including both higher selectivity and lower energy requirement, as well as minimal effects on microorganisms.

In some embodiments, the membrane can comprise a nonporous selective layer (e.g., a hydrophobic layer such as polydimethylsiloxane), porous support layer, and a polyethylene layer disposed between the support layer and the selective layer. The membrane can be configured to selectively separate an organic component from an aqueous solution. In various embodiments, (i) the organic component is n-butanol; (ii) the polyethylene layer has a pore size of 35 micrometers to 125 micrometers; (iii) the polyethylene layer has a thickness of 600 micrometers to 900 micrometers; (iv) the selective layer further comprises a hydrophobic filler; (iv) the hydrophobic filler is selected from the group consisting of activated carbon, silicalite, hydrophobic zeolite-based adsorbents, hydrophobic molecular sieves, hydrophobic polymer resin adsorbents, and combinations comprising at least one of the foregoing hydrophobic fillers; and/or (v) the hydrophobic filler is present in the selective layer in an amount of 1 wt % to 25 wt %, based upon a total weight of the selective layer.

In some embodiments, the method for separating an organic component from an aqueous stream can comprise: introducing the aqueous stream comprising the organic component to a feed chamber where the aqueous solution contacts a nonporous, hydrophobic selective layer of a membrane, creating a vacuum on the side of the membrane comprising the support layer, permeating the organic component through the membrane into an exit chamber, and removing the organic component permeate from the exit chamber. The membrane can comprise the nonporous, hydrophobic selective layer, porous support layer, and polyethylene layer disposed between the support layer and the selective layer. In some embodiments, (i) the aqueous stream can be maintained at a temperature above room temperature; (ii) the aqueous stream can be maintained at a temperature of 27° C. to 50° C.; (iii) the organic component can be n-butanol; (iv) the nonporous, hydrophobic selective layer can be polydimethylsiloxane; and/or (v) the method can further comprise condensing the organic component permeate.

Ranges disclosed herein are inclusive and combinable (e.g., ranges of "up to about 25 mass %, or, more specifically, about 5 mass % to about 20 mass %", is inclusive of the endpoints and all intermediate values of the ranges of "about 5 mass % to about 25 mass %," etc.). "Combination" is inclusive of blends, mixtures, alloys, reaction products, and the like. Furthermore, the terms "first," "second," and the like, herein do not denote any order, quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the state value and has the meaning dictated by context, (e.g., includes the degree of error associated with measurement of the particular quantity). The suffix "(s)" as used herein is intended to include both the singular and the plural of the term that it modifies, thereby including one or more of that term (e.g., the reactor(s) includes one or more reactors). Reference throughout the specification to "one embodiment", "another embodiment", "an embodiment", and so forth, means that a particular element (e.g., feature, structure, and/or characteristic) described in connection with the embodiment is included in at least one embodiment described herein, and can or can not be present in other embodiments. In addition, it is to be understood that the described elements can be combined in any suitable manner in the various embodiments. As used herein, the terms sheet, film, plate, and layer, are used interchangeably, and are not intended to denote size.

While the invention has been described with reference to several embodiments thereof, it will be understood by those skilled in the art that various changes can be made and equivalents can be substituted for elements thereof without departing from the scope of the invention. In addition, many modifications can be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

The invention claimed is:

1. A membrane, comprising:
    a nonporous selective layer comprising polydimethylsiloxane;
    a porous support layer; and
    a polyethylene layer disposed between the support layer and the selective layer, wherein the polyethylene layer has a pore size of 20 micrometers to 200 micrometers; and
    wherein the membrane is configured to selectively separate an organic component from an aqueous solution.

2. The membrane of claim 1, wherein the organic component is n-butanol.

3. The membrane of claim 1, wherein the polyethylene layer has a thickness of less than or equal to 2,000 micrometers.

4. The membrane of claim 1, wherein the selective layer further comprises a hydrophobic filler.

5. The membrane of claim 4, wherein the hydrophobic filler is selected from the group consisting of activated carbon, silicalite, hydrophobic zeolite-based adsorbents, hydrophobic molecular sieves, hydrophobic polymer resin adsorbents, and combinations comprising at least one of the foregoing hydrophobic fillers.

6. The membrane of claim 4, wherein hydrophobic filler is present in the selective layer in an amount of 1 wt % to 25 wt %, based upon a total weight of the selective layer.

7. The membrane of claim 1, wherein the polyethylene layer comprises pure polyethylene.

8. The membrane of claim 1, wherein the selective layer has a thickness of 50 micrometers to 250 micrometers.

9. The membrane of claim 1, wherein the selective layer is preformed.

10. The membrane of claim 1, wherein the selective layer, the support layer and the polyethylene layer are formed separately.

11. A membrane, comprising: a nonporous selective layer comprising polydimethylsiloxane; a porous support layer; and a polyethylene layer disposed between the support layer and the selective layer, wherein the polyethylene layer has a pore size of 20 micrometers to 125 micrometers; and wherein the membrane is configured to selectively separate an organic component from an aqueous solution.

12. The membrane of claim 11, wherein the polyethylene layer has a thickness of 500 micrometers to 1,000 micrometers.

13. A method for separating an organic component from an aqueous stream, comprising:
    contacting a nonporous, hydrophobic selective layer of a membrane with the aqueous stream comprising the organic component;
    wherein the membrane comprises the nonporous, hydrophobic selective layer, a porous support layer, and a polyethylene layer having a pore size of 20 micrometers to 200 micrometers disposed between the support layer and the selective layer,
    creating a vacuum on the side of the membrane comprising the support layer;
    permeating the organic component through the membrane into an exit chamber; and
    removing the organic component permeate from the exit chamber.

14. The method of claim 13, wherein the aqueous stream is maintained at a temperature above room temperature.

15. The method of claim 14, wherein the temperature is 25° C. to 50° C.

16. The method of claim 13, wherein the organic component is n-butanol.

17. The method of claim 13, further comprising condensing the organic component permeate.

18. The method of claim 13, wherein the nonporous, hydrophobic selective layer comprises polydimethylsiloxane.

19. The method of claim 13, wherein the polyethylene layer comprises pure polyethylene.

* * * * *